June 2, 1953  T. R. BIKO ET AL  2,640,659
FILM ATTACHING MEANS FOR REELS
Filed March 4, 1950
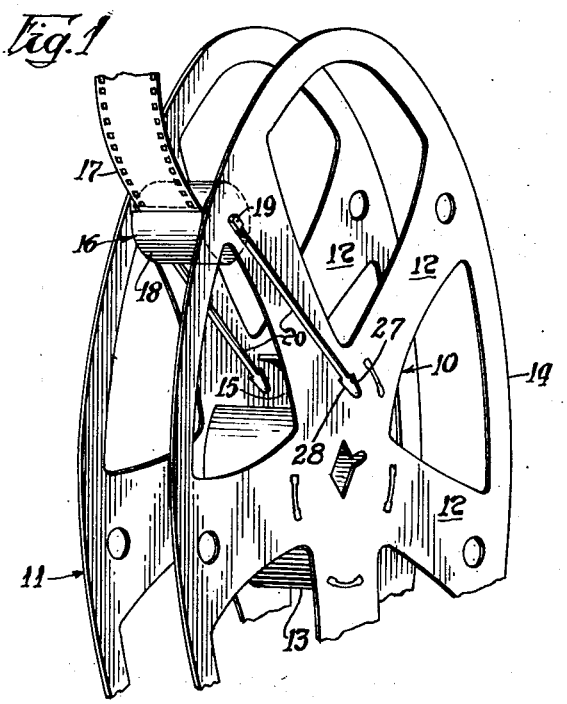
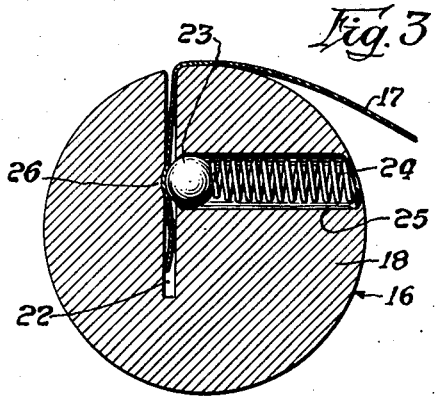
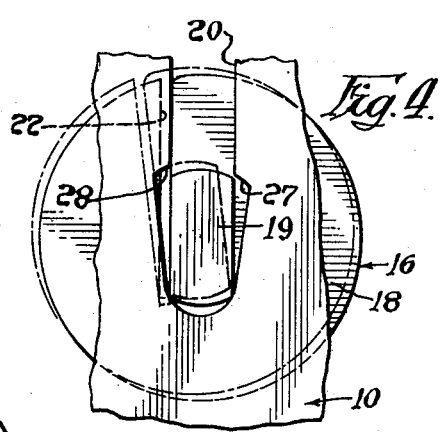
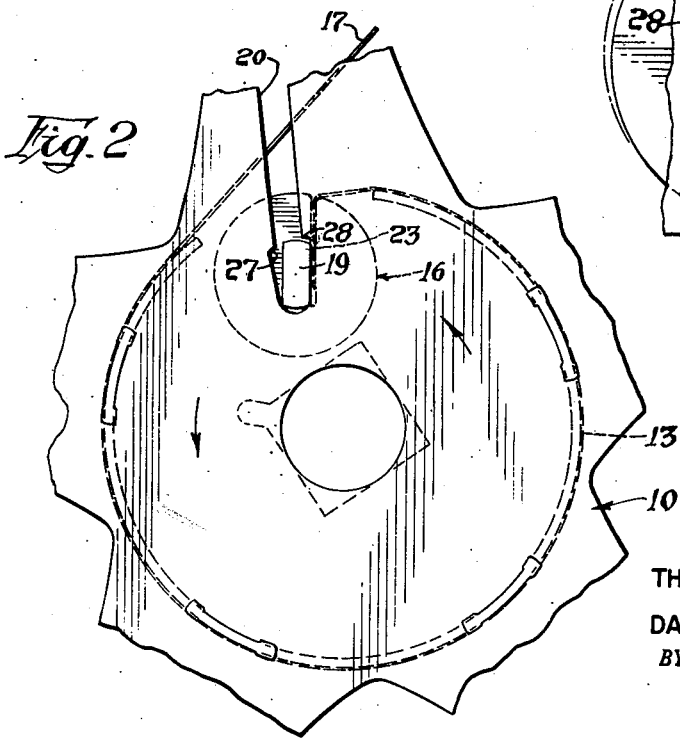
INVENTORS
THEODORE R. BIKO,
DANIEL S. DEUTSCH
BY
*Attorney.*

Patented June 2, 1953

2,640,659

UNITED STATES PATENT OFFICE 2,640,659

FILM ATTACHING MEANS FOR REELS

Theodore R. Biko and Daniel S. Deutsch, Los Angeles, Calif.

Application March 4, 1950, Serial No. 147,742

5 Claims. (Cl. 242—74)

This invention has to do generally with motion picture film reels, and is directed particularly to improvements in a type of reel adapted for convenient and easy attachment of the film to the reel, by the provision of a holding element displaceable generally radially of the reel between an outer position of direct accessibility and an inner winding position at or within the hub of the reel.

Heretofore there have been proposals for incorporating in a reel a displaceable film anchor or holding element, by various means characterized, in comparison with the present invention, by their relative inconvenience in operation or undesirable structural features. Our primary object is to provide an improved reel and radially movable film holder combination of ultimate simplicity and capacity for both anchoring the end of the film, and assuring its maintenance in winding relation to the hub.

In accordance with the invention, we may equip any suitable specific form of reel with a holding element accommodated for free shuttling movement radially, or generally radially of the reel, within slots so extended as to permit shifting of the element to an outer portion near the periphery of the rim where the element is easily accessible for reception of the film to an inner and film winding position within the hub.

The invention is more particularly concerned with the maintenance of the holding element against inadvertent displacement from winding position within the hub. In accomplishing this purpose, I provide for a simple locking shoulder arrangement engageable by the holding element necessarily by virtue of any appreciable tension applied to the film, or by virtue of the angular position of the reel, so that once returned from its outer film securing position to its winding location in the hub, the holding element becomes effectively held against outward displacement simply as a result of the normal manipulation of the film and reel.

All the various features and objects of the invention, as well as the details of an illustrative embodiment, will be understood to best advantage from the following detailed description of the accompanying drawing, in which:

Fig. 1 is a view showing in perspective a portion of a film reel carrying the holding device which here is illustrated in its outermost position;

Fig. 2 is a fragmentary side view of the reel at the hub, illustrating the holding element in its innermost or film winding position, with the element engaged against one of the locking shoulders;

Fig. 3 is an enlarged cross section of the holding element taken in the plane of the film retaining detent; and Fig. 4 is an enlarged fragmentary view showing a portion of the reel and the film holding element as seen in Fig. 2 but in an intermediate position.

Referring first to the general showing of Fig. 1, the film reel is illustrated typically as comprising a pair of parallel circular sections 10 and 11 each having radial spokes 12 extending from an attached hub shell 13 to a circular rim 14. The hub shell 13 contains a recess 15 within which is receivable a film holding element 16 mounted for free sliding movement outwardly and inwardly of the reel between the positions indicated in Figs. 1 and 2. As shown in the latter view, the holding element is receivable within the hub shell to an extent such that when locked in the Fig. 2 position, the element 16 permits winding of the film 17 in substantially complete circular form on the hub.

Holding element 16 comprises a cylindrical body 18 carrying at opposite ends a pair of axially alined end projections 19 which are slidable within slots 20 in an opposite path of the reel spokes 12. The slots 20 extend generally, radially of the reel, and may be formed on a true radius or varied to some degree therefrom substantially as shown. Outward displacement of the element 16 to the Fig. 1 position in which it is directly and conveniently accessible for reception of the film 17, is limited by the engagement of projections 19 with the outer ends of the slots 20. Inward movement of the element may be limited as shown in Figs. 2 and 4 by engagement of the projections with the inner ends of the slots 20.

As typically illustrated in Fig. 3, the holding element 16 contains a longitudinal slot 22 within which may be inserted a free end of the film 17. The film may be held releasably within the slot by any suitable means, though preferably by a ball detent 23 urged by a coil spring 24 within the bore 25, so that the ball detent engages the film opposite a recess or indentation 26. Thus the film is more securely held by reason of the tendency of the detent to deflect the film to a minor degree within the recess 26. Although thus held against accidental disengagement from the element, it may be readily removed by manually pulling the film out of the holder slot.

When in its innermost position radially of the reel, the holding element 16 is releasably locked against outward displacement, by the engageability of the projections 19 with either of shoulders 27 and 28 formed at opposite end preferably offset locations, within the sides of the recesses 20. The function of the holding shoulders may be well considered by reference to Fig. 2 wherein after reception of the film, the holding element 16 has been returned to its normal position within the hub shell 13 in order to permit starting of the film winding. Assuming the reel to be rotated counterclockwise, the film tension transmitted to the element 16 causes it to rotate relative to the reel, with the result that the projections 19 are brought into engagement with shoulders 27. Thus the holding element is locked against outward movement and release or fouling of the film, as might otherwise result from the holding element being free to respond to centrifugal or gravitational force.

If for any reason, such as the development of slackness in the film, there may be transmitted to the projections 19 force tending to rotate them relative to the reel and away from shoulder 27, or counterclockwise from the Fig. 4 solid line position, then the projections become engageable with shoulders 28 and the holding element is again locked against outward displacement. By virtue of the relative offset of the opposed shoulders 27 and 28, assurance is given that upon the release from shoulders 27 and some degree of outward displacement, whether due to gravity or centrifugal force, projections 19 under the influence of the film will be brought to engage shoulders 28.

We claim:

1. The combination comprising a film reel having a hub portion, a holding element for retaining the end of the film and freely displaceable by gravity both outwardly and inwardly of the reel between positions adjacent the hub and peripheral portions thereof, and a pair of holding means releasably engageable by rotation of said element in opposite directions relative to the reel at a substantially single position radially thereof to retain the element in either of two positions against outward movement from the hub portion.

2. The combination comprising a film reel having a hub portion and parallel spokes extending outwardly therefrom to rim portions, a holding element for retaining the end of the film and freely displaceable within slots in said spokes by gravity both outwardly and inwardly of the reel between positions within the hub and adjacent said rim portions, said element comprising a substantially cylindrical body portion received within a recess in the hub and a pair of end projections traveling with said slots, and holding shoulders formed in the edges of one of said slots said projections being positionable to engage said shoulders and thereby become retained against movement outwardly from said hub portion by rotation of the element at a fixed position radially of the reel at the inner ends of the slots.

3. The combination comprising a film reel having a hub portion and parallel spokes extending outwardly therefrom to rim portions, a holding element for retaining the end of the film and having end projections freely displaceable within slots in said spokes by gravity both outwardly and inwardly of the reel between positions within the hub and adjacent said rim portions, and a pair of holding shoulders formed in opposite edges of one of said slots said projections being positionable to engage said shoulders and thereby become retained against movement outwardly from said hub portion by rotation of the element in opposite directions at a fixed position radially of the reel at the inner ends of the slots.

4. The combination comprising a film reel having a hub portion and parallel spokes extending outwardly therefrom to rim portions, a holding element for retaining the end of the film and freely displaceable within slots in said spokes by gravity both outwardly and inwardly of the reel between positions within the hub and adjacent said rim portions, and a pair of holding shoulders formed in opposite edges of each slot at locations offset longitudinally thereof said element being positionable to selectively engage said shoulders and thereby become retained against movement outwardly from said hub portion by rotation of the element at a fixed position radially of the reel at the inner ends of the slots.

5. The combination comprising a film reel having a hub portion and parallel spokes extending outwardly therefrom to rim portions, a holding element for retaining the end of the film and freely displaceable within slots in said spokes by gravity both outwardly and inwardly of the reel between positions within the hub and adjacent said rim portions, said element comprising a substantially cylindrical body portion received within a recess in the hub and a pair of end projections having opposite flattened faces traveling within said slots, and a pair of holding shoulders formed in opposite edges of each slot at near the inner ends thereof, locations offset longitudinally of the slot and selectively engageable by said element by its rotation in opposite directions in the slots to releasably retain the element against movement outwardly from said hub portion.

THEODORE R. BIKO.
DANIEL S. DEUTSCH.

References Cited in the file of this patent

UNITED STATES PATENTS

| Number | Name | Date |
|--------|------|------|
| 1,172,349 | Frappier | Feb. 22, 1916 |
| 1,871,234 | Proctor | Aug. 9, 1932 |
| 1,899,279 | Lessler | Feb. 28, 1933 |
| 2,107,530 | Goldberg | Feb. 8, 1938 |
| 2,290,853 | Frankel | July 28, 1942 |

FOREIGN PATENTS

| Number | Country | Date |
|--------|---------|------|
| 14,285 | Great Britain | of 1915 |